INVENTOR.
DAVID M. HYSINGER
BY
ATTORNEY

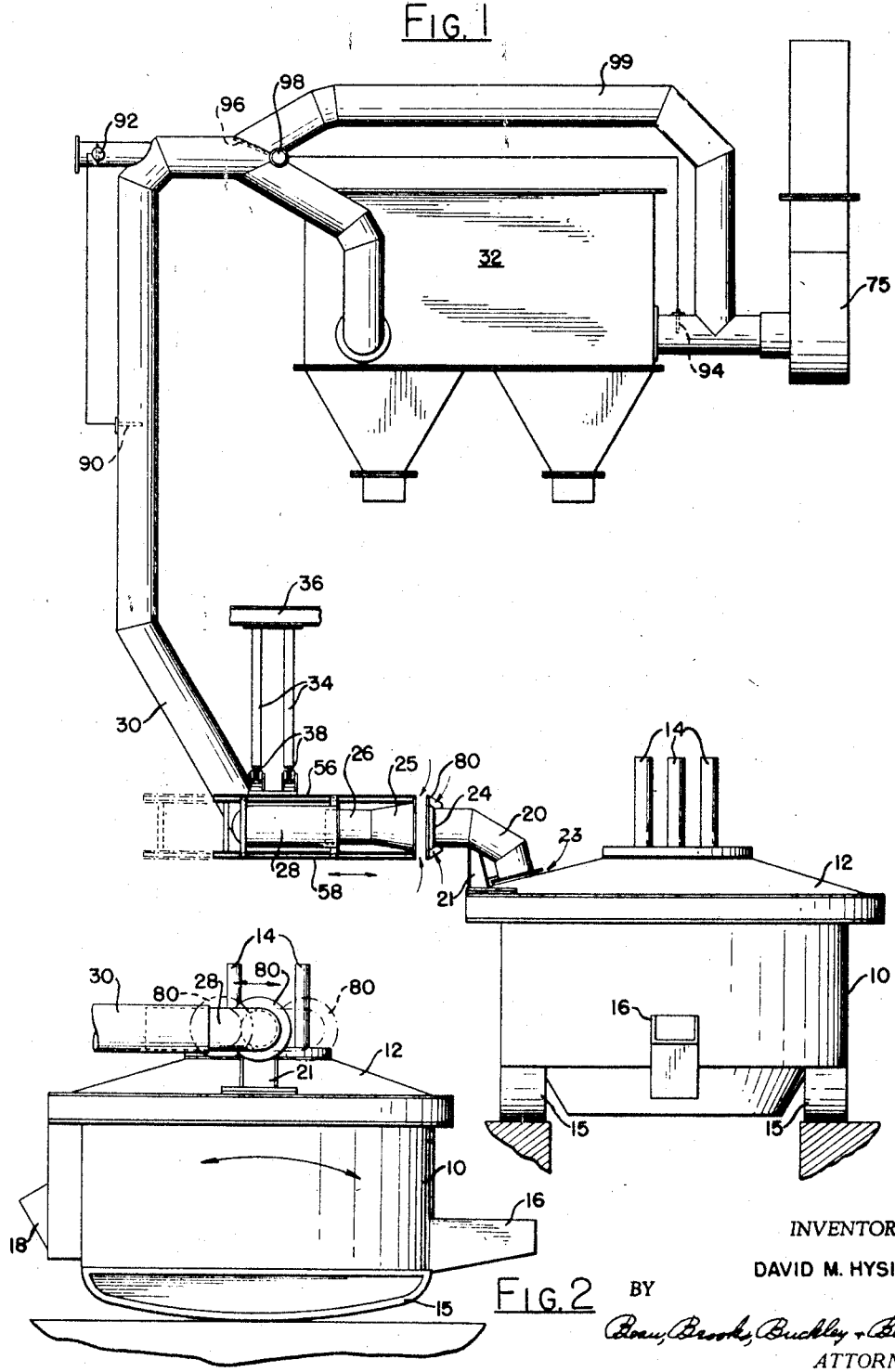

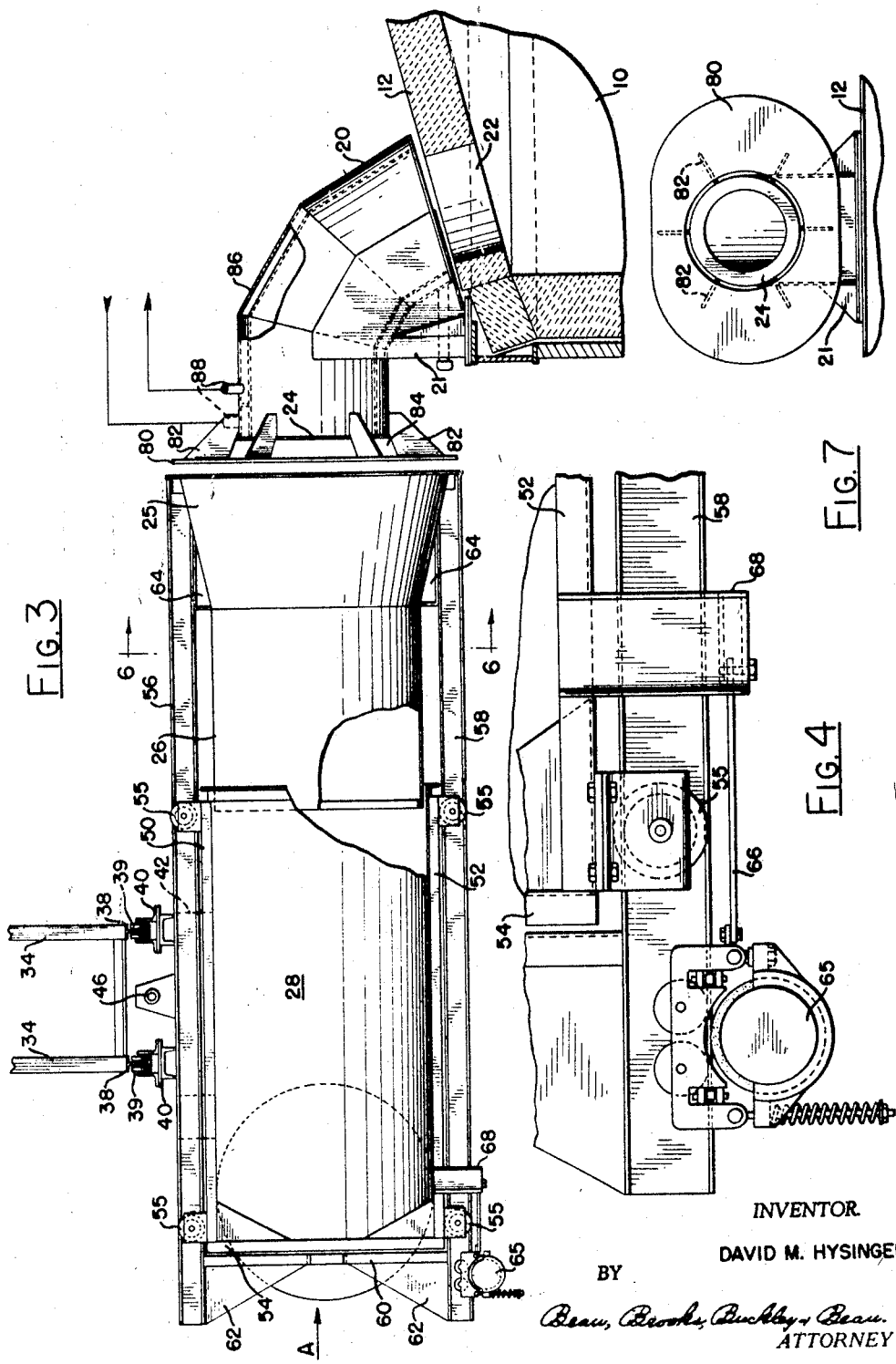

3,173,980
FURNACE DUST AND FUME COLLECTION SYSTEM
David M. Hysinger, Mishawaka, Ind., assignor, by mesne assignments, to The Wheelabrator Corporation, Mishawaka, Ind., a corporation of Delaware
Filed Nov. 21, 1962, Ser. No. 239,142
10 Claims. (Cl. 266—34)

This invention relates to industrial furnaces, and more particularly to an improved method and means for evacuating and collecting furnace dust and fumes generating within electric arc furnaces or other types of smelting, melting, or refining furnaces such as are employed in the metallurgical industries. Also, the invention provides in connection therewith improved means for controlling and maintaining metallurgically optimum pressure conditions within the furnace.

In such furnaces varying and sometimes large volumes of dust and fumes are generated, and must be conveyed away and disposed of. Otherwise in electrical furnaces, for example, large quantities of dust and fumes emanate from the heating electrode passageways in the furnace roof, and around the joint between the roof and the furnace body, and from the working doors.

Heretofore various hood arrangements have been suspended above and about the furnaces and connected to exhaust fans to maintain a flow of air over and around the dust and fume emitting portions of the furnaces. However, in some cases such hoods have been found to involve the necessity for subsequently treating large quantities of air and furnace gas mixtures, which can be an acute and expensive problem. Also, use of the roof type hood involves interference with uniform maintenance of metallurgically optimum pressure conditions within the furnace and interference with accessibility to the furnace electrodes. For example, in the so-called "direct shell evacuation" furnace systems presently in use, the smoke and fume are actively drawn from the furnace by means of suction. Such systems necessarily involve relatively high costs of installation and maintenance, and also introduce metallurgically undesirable reduced pressure conditions inside the furnace. Also, such systems tend to draw off undesirable large quantities of unburned gases, which create dangerous explosion hazards. Suction within the furnace is considered undesirable from a metallurgical standpoint because of the oxidizing air drawn into the furnace and because of the heat loss resulting from the excess of air passing through the furnace, and because suction draws air through the electrode openings which operates to erode the carbon electrodes. For optimum metallurgical results some electrical furnace operations require a slight positive pressure; others require atmospheric pressure; and still others give best results under slight negative pressures. Thus ability to maintain precisely prescribed pressure conditions in the furnace (despite wide variances in the rate of dust and fume production) is a prime requisite.

It is a primary object of the present invention to provide a dust and fume drawoff means for metallurgical furnaces or the like which will satisfactorily collect varying loads of dust and fume, as produced.

A further object is to provide improved means for collecting dust and fume from electric furnaces or the like, whereby the volume of gases collected and requiring subsequent handling is kept to a minimum.

Another object of the present invention is the provision of an improved dust and fume collector that effectively traps the furnace dust and fume while in-drawing a minimum amount of ambient air, yet which is simple to adjust and maintain and avoids interference with normal furnace operations.

Another object is to provide a gas and fume collection system as aforesaid which will operate efficiently while permitting the furnace attendant to precisely control the ambient air "breathing" of the system, as well as the furnace internal pressure.

Another object is to provide a device as aforesaid that will not interfere with the furnace electrodes, and which will operate effectively without increasing the electrode consumption rate.

Another object is to provide a device as aforesaid employing a supplemental air inlet valving system between the furnace discharge and take-away duct systems; the variable valve mechanism being structurally supported independently of the furnace per se.

Another object is to provide an improved dust and fume drawoff mechanism as described, which operates to permit the furnace gases to leave the furnace without interference, and then pick them up by means of an aspirating mechanism for conveyance to the delivery duct system.

Another object is to provide a device as aforesaid which operates effectively without need of relatively expensive and complicated control mechanisms such as pressure sensing and transmitting devices and instruments, damper valves, etc.; and which will not operate to draw off excessive quantities of unburned gases thereby creating explosion hazards.

Another object is to provide an improved device as aforesaid which operates automatically to avoid occasional low gas volume and low gas velocity effects in the fume drawoff system, whereby sporadic depositions of heavier dust particles in the ducting system is avoided.

Still another object is to provide a means as aforesaid which is particularly effective when used on tilting type furnaces.

Still another object is to provide an apparatus as aforesaid which is structurally simple and inexpensive to construct, and which is of improved durability and useful life and free from maintenance problems.

Other objects and advantages of the present invention will be apparent from the specification herewith, and the accompanying drawing wherein:

FIG. 1 is a schematic illustration, in front view, of a system of the present invention applied to an electric metallurgical furnace;

FIG. 2 is a schematic side view of the electric furnace illustrated in FIG. 1;

FIG. 3 is an enlarged scale fragmentary view of a portion of FIG. 1;

FIG. 4 is an enlarged scale fragmentary view of a detail of FIG. 3;

FIG. 7 is a view corresponding to FIGS. 5, 6, but illustrating a modified form of flange such as may be employed in conection with the device of the invention.

Figure 5:
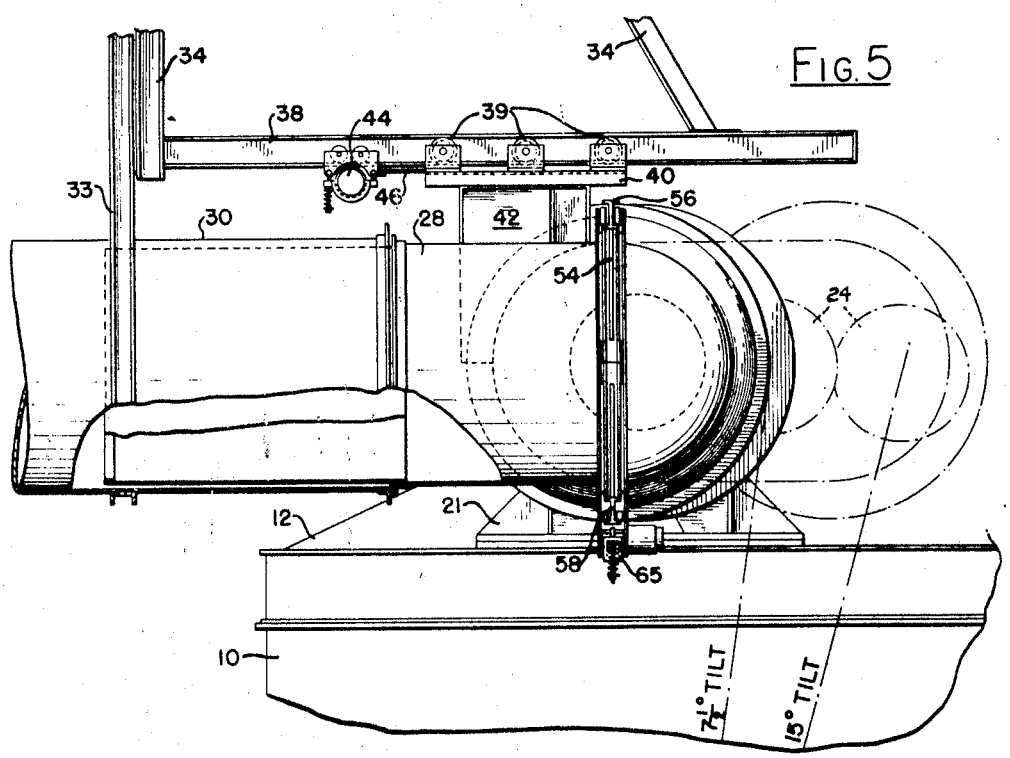
FIG. 5 is an enlarged scale fragmentary side view of a detail of FIG. 2, showing the furnace in upright position.
Figure 6:
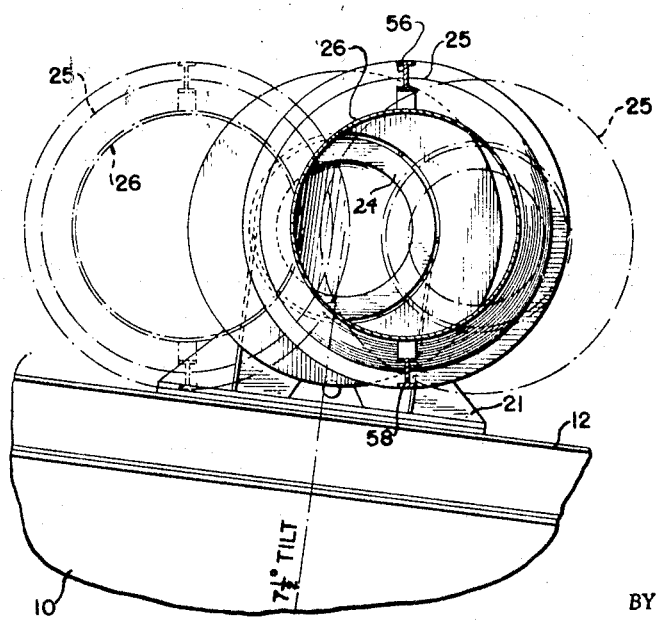
FIG. 6 is a fragmentary sectional view taken along line VI–VI of FIG. 3 and showing the furnace in tilted position.

The invention contemplates generally, a system which comprises means for collecting and disposing of dust and fume rising within the interior of a furnace, including means forming a liquid-cooled drawoff stack cooperating with a fume outlet opening in the roof of the furnace to receive the hot fumes and dust and deliver them to the funnelled inlet of a duct system; the funnel inlet being separated from the discharge end of the stack by an adjustable ambient air inlet gap, said duct means connecting to a suction source and to a dust and fume disposal means; and means controlled by the furnace attendant to vary and regulate the air gap size thereby maintaining a prescribed uniform pressure condition in the interior of the furnace.

Referring now to the specific form of the invention shown by way of example in the accompanying drawing, an electric furnace of a type often used in the metallurgical industry to melt and refine steel or iron is indicated at 10 and is shown as being provided with a roof 12. The roof and the body of the furnace are usually constructed of fire brick, as is well known in the art; and openings are formed through the roof to accommodate the usual carbon electrodes 14. Typically, the furnace is supported on pivot or rocker supports as shown at 15, and the metal pouring and slag discharge spouts are indicated at 16 and 18, respectively.

In accord with the present invention, a fume and dust collector is provided in the form of a fume collecting conduit 20, the intake end of which covers an opening 22 in the furnace roof. The conduit 20 is supported by means of a bracket 21 or the like extending from the furnace structure, and the intake end of the conduit is slightly spaced from the furnace to provide a pie-shaped air gap therebetween as shown in FIG. 1, through which ambient air enters (23) to assist in the complete combustion of unburned furnace gases, and to cool the walls of the conduit 20. The conduit 20 is elbow-shaped to discharge horizontally at its discharge end 24 in alignment with the funnelled intake end 25 of a receiver conduit 26 which in turn extends into telescopic sliding relation with a lead-off conduit 28. The lead-off conduit 28 is elbow-shaped in plan form and its discharge end is telescopically received within a stationary conduit 30 which as shown in FIG. 1 leads away to a dust collector system as indicated generally at 32. A stationary support for the conduit 30 is indicated at 33, FIG. 5.

The receiver conduit 26 and the lead-off conduit 28 are carried by suspension frame devices hanging from stationary adjacent structure, and as shown herein the suspension frame structure includes a pair of struts 34 hanging from an overhead beam 36 (FIG. 1) and carrying at their bottom ends trolley rails 38 upon which trolley units 39 run in the direction of telescopic movement of the lead-off conduit 28 relative to the stationary conduit 30. The trolley units 39 carry support beams 40—40 from which extends downwardly a bracket structure 42 to which the elbow-shaped lead-off conduit 28 is firmly mounted. A powered trolley-motor unit as indicated at 44 is conveniently mounted on one of the beams 38 and is operably connected to the conduit support bracket 42 as by means of a push-pull member 46. Thus, it will be appreciated that reverse direction operation of the motor unit 44 will actuate the push-pull member to correspondingly displace the conduit member 28 relative to the stationary conduit 30, for purposes to be explained hereinafter.

The movable support beam system comprising the beams 40—40 and the bracket 42 also support a rectangular frame system comprising top and bottom beams 50, 52 and an end post 54 all of which structurally embrace the intake arm of the conduit 28 (FIGS. 3, 5). The beams 50, 52 support rollers 55 which ride in trolley rails 56, 58 running transverse to the direction of the trolley rails 38—38 and in directional alignment with the movable receiver conduit 26. The structural frame including the trolley rails 56, 58 is completed by means of a vertical beam and bracket arrangement as indicated at 60, 62 (FIG. 3) and the funnel end-portion 25 of the conduit 26 is fixed to the forward ends of the trolley rails 56, 58 as by means of brackets 64. A powered trolley drive unit as indicated at 65 is conveniently arranged to run on the trolley rail 58 and to be coupled by means of a push-pull device 66 to bracket 68 extending from the beam 52.

Thus, it will be appreciated that provision is made for a fume and dust carry-off conduit system leading from the furnace opening 22 to the dust collector system 32, wherein the first conduit member 20 is supported directly by furnace structure while the final carry-off conduit is stationarily supported. The intermediately disposed elbow-shaped conduits are carried on transverse track systems to be telescopically related to the carry-off conduit 30 and to the collecting conduit 20. This arrangement enables the conduit system to accommodate tilting motions of the furnace on its rocking support mechanism, such as incidental to the pouring of finished metal from the spout 16 of the furnace, and the pouring of slag from the top of the melt as through the spout 18. Either manually or automatically controlled operations of the power unit 44 will extend or retract the conduit 28 relative to the conduit 30 and carry with it the frame supporting the conduits 26, 28 so that the intake end 25 may be kept in alignment with the discharge end portion 24 of the collection conduit 20.

The primary feature of the invention however relates to the provision for controlling the disposition of the funnelled intake end 25 of the conduit system relative to the discharge end 24 of the cooling conduit 20. It has been determined that whereas an electric furnace will generate varying quantities of fume and dust throughout each operating cycle, in order to maintain optimum metallurgical operating conditions in the melt, as well as uniformly efficient collection and disposal of generated fumes and dust, the fume and dust carry-off system must be variably controlled and adjusted from time to time. The present invention accomplishes the above stated purpose, and other incidental advantages such as improved cooling of the conduit system, through employment of a variable orifice aspirating action at the juncture of the conduit portions 24, 25. The conduit system is subjected to a suction or reduced pressure condition, such as by means of an exhaust fan indicated at 75 (FIG. 1) which provides the requisite suction for operation of the dust collecting unit 32. Simultaneously therewith the fan provides a residuum of reduced pressure condition at the annular orifice defined by the gap between adjacent ends of the conduit portions 24, 25, which is sufficient to draw into the conduit funnel 25 substantially all of the fume and dust exuding from the conduit portion 24 as it is generated by the furnace.

The parts are so arranged that no substantial suction is applied to the interior of the furnace, such as would otherwise adversely affect the metallurgical efficiency of the operation; any excess of suction effect at the annular orifice being translated into fresh air inflow from around the orifice and into the conduit-dust collecting system. Thus, the ambient air being drawn through the annular orifice functions both to relieve any undesirable suction effects on the furnace and to procure as influx of ambient which functions to cool off the excessively hot fume and dust particles emitting from the furnace. Thus the conduit system is protected against excessive heating, and the dust particles are cooled off before going into the dust collector system. This latter feature is important whenever the dust collecting system employs cloth filters or the like.

As shown in FIGS. 1, 3 and 7, the annular orifice system may include an annular face plate 80 mounted as by means of brackets 82 to encircle the discharge opening at 24; the outer perimeter of the face plate 80 being generally oval-shaped and lengthened in the horizontal direction whereby to substantially close the space between the discharge end 24 and the circular intake opening 25 of the receiver conduit 26, notwithstanding tilting motions of the furnace such as may not be matched by telescopic adjustments of the conduit system by means of the power unit 44. As shown in FIG. 3, the face plate device may be constructed to provide a secondary ambient air inlet gap as indicated at 84, or of course no such gap need be provided, as may be preferred. Also as shown in FIG. 1, the collector conduit 20, being subjected to the hottest fumes from the furnace prior to their cooling by means of ambient air through the annular orifice, may be constructed of special heat resistant material and/or coolant-jacketed as indicated at 86 for circulation of cooling liquid therethrough as by means of connections indicated at 88.

The system of the invention envisions an improved overall temperature reduction and control arrangement which is integrated with the cooling air inlet orifice control arrangement referred to hereinabove. Whereas the receiving conduit 26 is arranged to be displaced toward and away from the collecting conduit face plate 80, under remote control by the furnace operator or automatically and in accordance with the internal pressure requirements of the furnace and to thereby substantially maintain a prescribed pressure and temperature gradiant throughout the duct and dust collector systems. Any fluctuations from the prescribed conditions at critical stations in the duct system may be automatically compensated and corrected by the simple addition of a suitable damper and bypass arrangement under automatic control of temperature and/or pressure sensing devices.

For example, as shown in FIG. 1, a temperature sensor as indicated at 90 may be strategically placed in the duct system 30 ahead of the dust collector mechanism and connected to control a damper valve 92 which when open will permit flow of cooling ambient air into the duct leading to the separator. Also, a temperature sensor as indicated at 94 may be disposed in the duct between the separator and exhaust fan 75, and operably coupled to a flapper valve 96 controlled by a motor 98 so that whenever the atmosphere exhausting from the dust collector mechanism reaches a predetermined maximum tolerable temperature, the valve 96 will be swung downwardly so as to close off the entrance to the dust collector while permitting the over-hot gases to temporarily pass through the bypass conduit 99 and thence out through the exhaust fan.

I claim:

1. In an industrial furnace assembly including a furnace mounted for tilting action about a generally horizontal axis and having an exit opening for gases, a collector adapted to be fixed to the furnace to be serviced and having an inlet end portion adapted to embrace said opening and having a discharge end portion spaced from said horizontal axis about which the furnace may be tilted and facing in a direction substantially parallel with such axis, a receiver conduit device having its intake end portion disposed in spaced fluid transport relation with the discharge end portion of said collector, said conduit device leading to a dust collector for separating dust and fume from the collected furnace gases and to an exhaust fan, said conduit device comprising a plurality of telescopically articulated conduit members whereby said device is extensible-retractable in directions toward and away from the discharge end of said collector and in horizontal directions laterally thereof, means for actuating said conduit device to vary the distance between the intake end thereof and the discharge end of said collector to thereby regulate the ambient air aspirating effect, and means for actuating said conduit device to displace the intake end thereof laterally for following the movements of the discharge end portion of said collector incidental to tilting of said furnace.

2. An apparatus for disposing of dust and fume in gases exiting from a furnace opening, said apparatus comprising in combination, a receiver conduit device having its intake end portion adapted to be disposed in fluid transport relation with the furnace opening, said conduit device leading to a dust collector for separating dust and fume from the collected furnace gases and to an exhaust fan, said conduit device comprising a plurality of telescopically articulated conduit members whereby said device is extensible-retractable in directions toward and away from said opening to provide a variable size ambient air aspiration gap, and means for actuating said conduit device to vary the width of said gap to thereby regulate the ambient air aspirating effect.

3. An apparatus for disposing of dust and fume in gases exiting from an opening in a furnace mounted for tilting action, said apparatus comprising in combination, a receiver conduit device having its intake end portion adapted to be disposed in fluid transport relation with the furnace opening, said conduit device leading to an exhaust fan, said conduit device comprising a plurality of telescopically articulated conduit members whereby said device is extensible-retractable in directions toward and away from said opening to provide a variable size ambient air aspiration gap and in horizontal directions laterally thereof, means for actuating said conduit device to vary the width of said gap to thereby regulate the ambient air aspirating effect, and means for actuating said conduit device to displace the intake end thereof laterally for following tilting movements of said furnace.

4. An apparatus for disposing of dust and fume in gases exiting from a furnace opening, said apparatus comprising in combination, a conduit device for carrying away the furnace fume and dust gases while permitting the furnace to be tilted, said conduit device including fluid exhaust means and means operable to regulate the position of said conduit intake end relative to said furnace opening to provide control of ambient atmosphere aspirating effects of varying intensities into said conduit device at a region adjacent said furnace opening.

5. An apparatus for disposing of dust and fume in gases exiting from a furnace opening, said apparatus comprising in combination, a conduit device having an intake adjacent said opening for carrying away the furnace fume and dust gases while permitting the furnace to be tilted, said conduit device including fluid exhaust means and dust and fume separation means and means for positionally displacing said conduit intake relative to the furnace opening for providing variable ambient atmosphere aspirating effects into said conduit device.

6. An apparatus for disposing of dust and fume in gases exiting from a furnace opening, said apparatus comprising in combination, a conduit device for carrying off the furnace fume and dust gases, said conduit device including fluid exhaust means and means for positionally displacing said conduit relative to the furnace opening for providing ambient atmosphere aspirating effects of varying degrees into said conduit device to provide for control of the atmospheric pressure interiorly of said furnace.

7. An apparatus for disposing of dust and fume in gases exiting from a furnace opening, said apparatus comprising in combination, a conduit device having its intake end in registry with the furnace opening for carrying off the furnace fume and dust gases, said conduit device including fluid exhaust means, means providing an ambient atmosphere aspirating effect into said conduit device at a position adjacent said furnace, and means operable to regulate the position of said conduit intake end relative to said opening to provide control of said aspirating effect.

8. An apparatus for disposing of dust and fume in gases exiting from a furnace opening, said apparatus comprising in combination, a conduit device having its intake end portion disposed in fluid transport spaced apart in-line relation with the furnace opening, and leading to a dust collector for separating dust and fume from the collected furnace gases, a fan operating in connection with said conduit device, said conduit device comprising a plurality of telescopically articulated conduit members whereby said device is extensible-retractable in directions toward and away from the discharge end of said furnace opening to provide a variable size ambient air aspiration gap therebetween, and means for actuating said conduit device to vary the width of said gap to thereby regulate the ambient air aspirating effect and/or control of the atmospheric pressure interiorly of said furnace.

9. An apparatus for disposing of dust and fume in gases exiting from an opening in a furnace mounted for tilting action, said apparatus comprising in combination, a receiver having its intake end portion adapted to be mounted on said furnace and disposed in fluid transport relation with the furnace opening, a conduit device leading to a dust collector for separating dust and fume from the collected furnace gases and to an exhaust fan, said conduit device comprising telescopically related conduit members whereby the intake end of said device is extensible-retractable in directions toward and away from the discharge end of said receiver and in directions laterally thereof, means for actuating said conduit device to vary the width of the gap between said receiver and said furnace opening to thereby regulate the ambient air aspirating effect, and means for actuating said conduit device to displace the intake end thereof laterally for following tilting movements of said furnace and said receiver.

10. An apparatus for disposing of dust and fume in gases exiting from an opening through the wall of a tilting furnace, said apparatus comprising in combination, a conduit device for carrying off the furnace fume and dust while permitting the furnace to be tilted, said conduit device including exhaust fan means and means for varying the effective size of ambient air inlet gap between said furnace opening and said conduit device, thereby providing controlled ambient atmosphere aspirating effects into said conduit device and/or regulation of the atmospheric conditions interiorly of the furnace.

References Cited by the Examiner
UNITED STATES PATENTS

| | | | |
|---|---|---|---|
| 2,693,749 | 11/54 | Houdek | 98—115 |
| 2,803,450 | 8/57 | McFeaters | 266—35 X |
| 3,026,102 | 3/62 | McFeaters | 266—15 X |

MORRIS O. WOLK, *Primary Examiner.*

JAMES H. TAYMAN, JR., *Examiner.*